United States Patent [19]
Koshikawa

[11] Patent Number: 5,493,464
[45] Date of Patent: Feb. 20, 1996

[54] THIN-FILM MAGNETIC HEAD WITH SEPARATE RECORDING AND REPRODUCING GAPS

[75] Inventor: Takao Koshikawa, Kawasaki, Japan

[73] Assignee: Fujitsu Limited, Kawasaki, Japan

[21] Appl. No.: 184,442

[22] Filed: Jan. 21, 1994

[30] Foreign Application Priority Data

Mar. 17, 1993 [JP] Japan .................................. 5-057537

[51] Int. Cl.⁶ .................................................. G11B 5/127
[52] U.S. Cl. ............................................ 360/113; 360/126
[58] Field of Search ................................... 360/113, 126

[56] References Cited

U.S. PATENT DOCUMENTS

| | | | |
|---|---|---|---|
| 5,132,859 | 7/1992 | Andricacos | 360/113 |
| 5,168,409 | 12/1992 | Koyama | 360/113 |
| 5,287,237 | 2/1994 | Kitada | 360/113 |

FOREIGN PATENT DOCUMENTS 61-276110 12/1986 Japan .
62-75924 4/1987 Japan .

*Primary Examiner*—A. J. Heinz
*Attorney, Agent, or Firm*—Armstrong, Westerman, Hattori, McLeland & Naughton

[57] ABSTRACT

A thin-film magnetic head includes a recording unit for generating a magnetic flux at a recording gap, which flux is used to magnetically record information on a magnetic disk, and a reproducing unit for reproducing information at a reproducing gap from the magnetic disk, wherein the recording unit and the reproducing unit are integrated with each other in a state where an interval between the center of the recording gap and the center of the reproducing gap is equal to or less than 2 μm. In addition, a thin-film magnetic head includes a recording unit for generating a magnetic flux used to magnetically record information on a magnetic disk, the recording unit having a soft magnetic layer used as one of magnetic poles for generating the magnetic flux, and a reproducing unit for reproducing information from the magnetic disk, the reproducing unit being separated by the soft magnetic layer from the recording unit, wherein the soft magnetic layer has a saturation magnetic flux density greater than 1.3 tesla.

8 Claims, 9 Drawing Sheets

FIG. IA  PRIOR ART
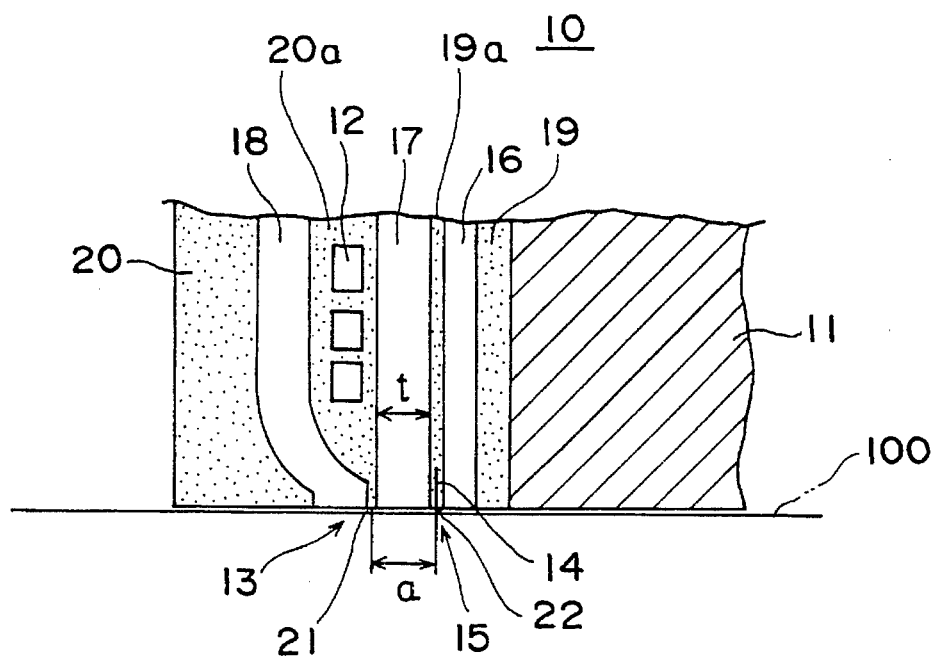
FIG. IB  PRIOR ART
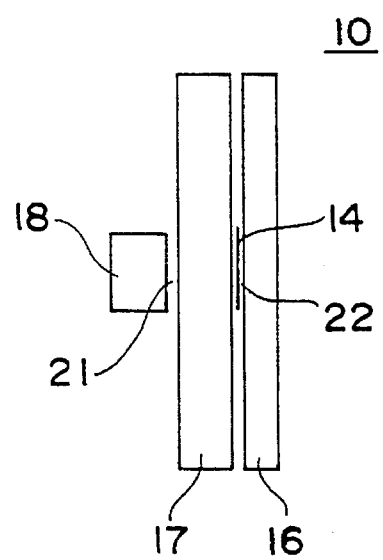

$t1 = 1.3 \mu m$
$b = 0.4 \mu m$
$c = 0.4 \mu m$
$a1 = 1.7 \mu m$ t2 = 1.3 μm
a2 = 1.7 μm $t3 = 1.3 \mu m$
$a3 = 1.7 \mu m$ $t4 = 1.5 \mu m$
$a4 = 1.9 \mu m$ t5 = 1.6 μm
a5 = 2.0 μm

THIN-FILM MAGNETIC HEAD WITH SEPARATE RECORDING AND REPRODUCING GAPS

BACKGROUND OF THE INVENTION (1) Field of the Invention

The present invention generally relates to a thin-film magnetic head, and more particularly to a thin-film magnetic head mounted on a swing-type actuator (a rotary actuator) in a magnetic disk device.

Magnetic disk devices are being miniaturized, so that the diameter of the magnetic disk used in each of them is decreased by about 1.8 inches. Due to the decrease of the diameter of the magnetic disk, the velocity of the magnetic head relative to the magnetic disk is decreased. In addition, to prevent the recording capacity of the miniaturized magnetic disk from being decreased, recording tracks must be formed at a high density on the magnetic disk. Thus, it is required that the thin-film magnetic head function normally even if the relative velocity of the magnetic head to the magnetic disk is decreased and even if the recording tracks are formed at a high density on the magnetic disk.

(2) Description of the Related Art

FIGS. 1A and 1B indicate a structure of a conventional thin-film magnetic head disclosed, for example, in Japanese Laid-Open Patent Application No. 61-276110. FIG. 1A is a cross sectional view of the conventional thin-film magnetic head and FIG. 1B is a view thereof projected on the surface of the magnetic disk.

Referring to FIGS. 1A and 1B, the thin-film magnetic head 10 has a substrate 11, a reproducing head part 15 and a recording head part 13. The reproducing head part 15 is stacked on the substrate 11, and further, the recording head part 13 is formed on the reproducing head part 15. The reproducing head part 15 has an insulating layer 19, a first magnetic layer 16, an insulating layer 19a, a second magnetic layer 17 and a magnetoresistance effect element (hereinafter referred to as an MR element) 14. The insulating layer 19 is formed on the substrate 11, and a structure in which the insulating layer 19a is positioned between the first magnetic layer 16 and the second magnetic layer 17 is stacked on the insulating layer 19. The MR element 14 is provided in the insulating layer 19 so as to face the surface 100 of the magnetic disk. In this reproducing head part 15, a reproducing gap 22 is formed between ends of the first and second magnetic layers 16 and 17 so as to face the surface 100 of the magnetic disk. The recording head part 13 has a structure in which an insulating layer 20a is sandwiched between the second magnetic layer 17 and a third magnetic layer 18, an insulating layer 20 covering the third magnetic layer 18 and coils 12 provided in the insulating layer 20a. A recording gap 21 is formed between ends of the second and third magnetic layers 17 and 18. The magnetic layers 16, 17 and 18 are made of NiFe (permalloy).

In the reproducing head part 15, the first magnetic layer 16 and the second magnetic layer 17 function as shield layers, and in the recording head part 13, the second magnetic layer 17 and the third magnetic layer 18 function as magnetic poles. That is, the second magnetic layer 17 is shared by both the reproducing head part 15 and the recording head part 13. This type of magnetic head is often referred to as a sharing type magnetic head. Another type of magnetic head is referred to, for example, as a separate type magnetic head. In the separate type magnetic head, the reproducing head part 15 and the recording head part 13 have two shield layers and two magnetic poles respectively. Thus, an interval (a) between the recording gap 21 and the reproducing gap 22 in the sharing type magnetic head can be narrower than that in the separate type magnetic head. The interval (a) between the recording gap 21 and the reproducing gap 22 is referred to as a gap interval (a).

According to the thin-film magnetic head having the above structure, information is reproduced from the magnetic disk via the MR element 14 of the reproducing head part 15. Thus, even if the relative velocity of the thin-film magnetic head 10 to the magnetic disk is small, reproducing signals having high levels can be obtained.

The above gap interval (a) depends on the thickness (t) of the second magnetic layer 17. Here, if it is assumed that the magnetic coercive force $H_c$ of the recording layer of the magnetic disk is equal, for example, to 1,800 Oe (oersted), a recording magnetic field strength equal to or greater than 3,600 Oe which is twice the magnetic coercive force $H_c$ is required to securely record signals in the recording layer of the magnetic disk. Since the saturation magnetic flux density $B_s$ of NiFe forming the magnetic layer 17 is equal to 1 T (tesla), the thickness (t) of the magnetic layer 17 must be equal to or greater than 2.4 μm to form a magnetic field having a magnetic field strength equal to or greater than 3,600 Oe in the space facing the end of the magnetic layer 17 (see a line I in FIG. 4). Thus, the conventional thin-film magnetic head has the gap interval (a), for example, of about 5 μm.

The thin-film magnetic head having the above structure is mounted at the end of a swing-type actuator which pivots on the other end thereof. Due to the pivoting of the swing-type actuator having the thin-film magnetic head, the angle between the direction of the thin-film magnetic head and the direction in which tracks of the magnetic disk runs varies. This angle is referred to as the yaw angle. A width of an area on which information is not reproduced to the variation of the yaw angle is defined as a yaw angle loss. Detailed description of the yaw angle and the yaw angle loss will be given later.

For example, in a case where the yaw angle of the swing-type actuator on which the above thin-film magnetic head is mounted is 10 degrees, the yaw angle loss has a large value of 1.75 μm. The larger the yaw angle loss, the smaller the width of a part of each track of the magnetic disk which part effectively faces the MR element 14 in the reproducing gap 22 of the thin-film magnetic head 10. Thus, if the yaw angle loss is large, it is difficult to reproduce a signal having a high quality. In addition the large yaw angle loss prevents the recording tracks from being formed at a high density on the magnetic disk.

SUMMARY OF THE INVENTION

Accordingly, a general object of the present invention is to provide a novel and useful thin-film magnetic head in which the disadvantages of the aforementioned prior art are eliminated.

A more specific object of the present invention is to provide a thin-film magnetic head in which the yaw angle loss is as small as possible in a state where it is mounted on a swing-type actuator.

The above objects of the present invention are achieved by a thin-film magnetic head comprising: a recording unit for generating a magnetic flux at a recording gap, which flux is used to magnetically record information on a magnetic disk; and a reproducing unit for reproducing information at a reproducing gap from said magnetic disk, wherein said recording unit and said reproducing unit are integrated with each other in a state where an interval between a center of the recording gap and a center of the reproducing gap is equal to or less than 2 μm.

The above objects of the present invention are also achieved by a thin-film magnetic head comprising: a recording unit for generating a magnetic flux used to magnetically record information on a magnetic disk, said recording unit having a soft magnetic layer used as one of magnetic poles for generating the magnetic flux; and a reproducing unit for reproducing information from said magnetic disk, said reproducing unit being separated by said soft magnetic layer from said recording unit, wherein said soft magnetic layer has a saturation magnetic flux density greater than 1.3 tesla.

According to the present invention, since the interval between the recording point and the reproducing point can be small, the yaw angle loss of the thin-film magnetic head mounted on the swing-type actuator can be reduced. Thus, the reproducing signal having a high quality can be obtained, and the density at which tracks are arranged on the magnetic disk can be increased.

Additional objects, features and advantages of the present invention will become apparent from the following detailed description when read in conjunction with the accompanying drawings.

BRIEF DESCRIPTION OF THE DRAWINGS

FIGS. 1A and 1B are diagrams illustrating a structure of a conventional thin-film magnetic head.

DESCRIPTION OF PREFERRED EMBODIMENT

A description will now be given, with reference to FIGS. 2A, 2B, 3, 4 and 5, of a first embodiment of the present invention.

Figure 2A:
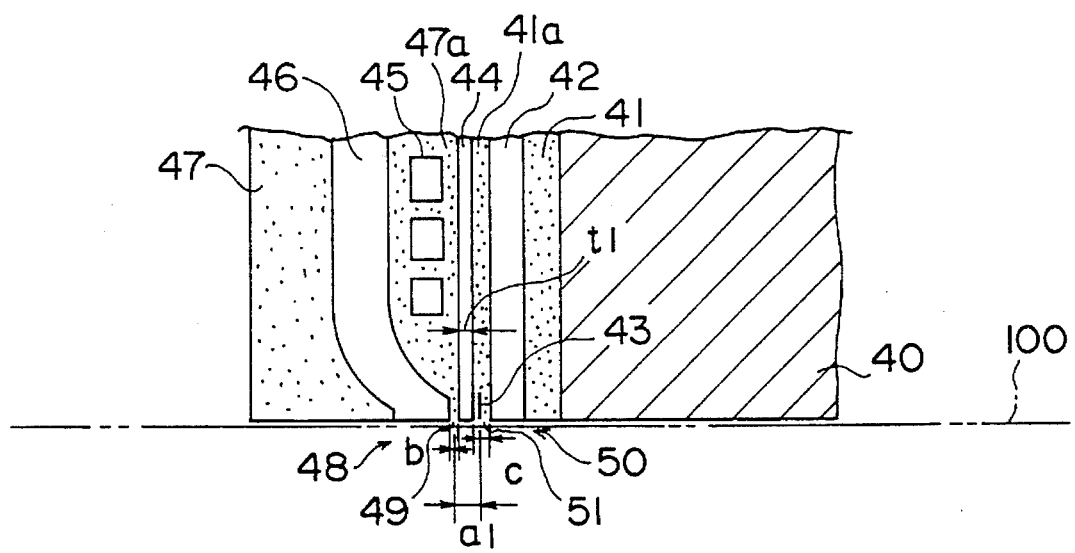
FIGS. 2A and 2B are diagrams illustrating a structure of a thin-film magnetic head according to a first embodiment of the present invention.
Figure 2B:
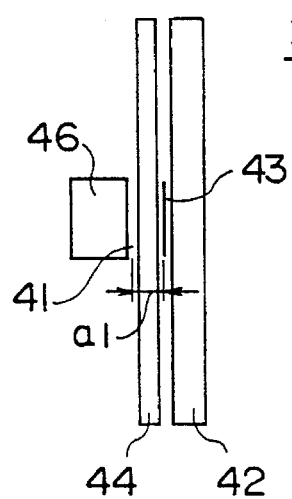
Figure 3:
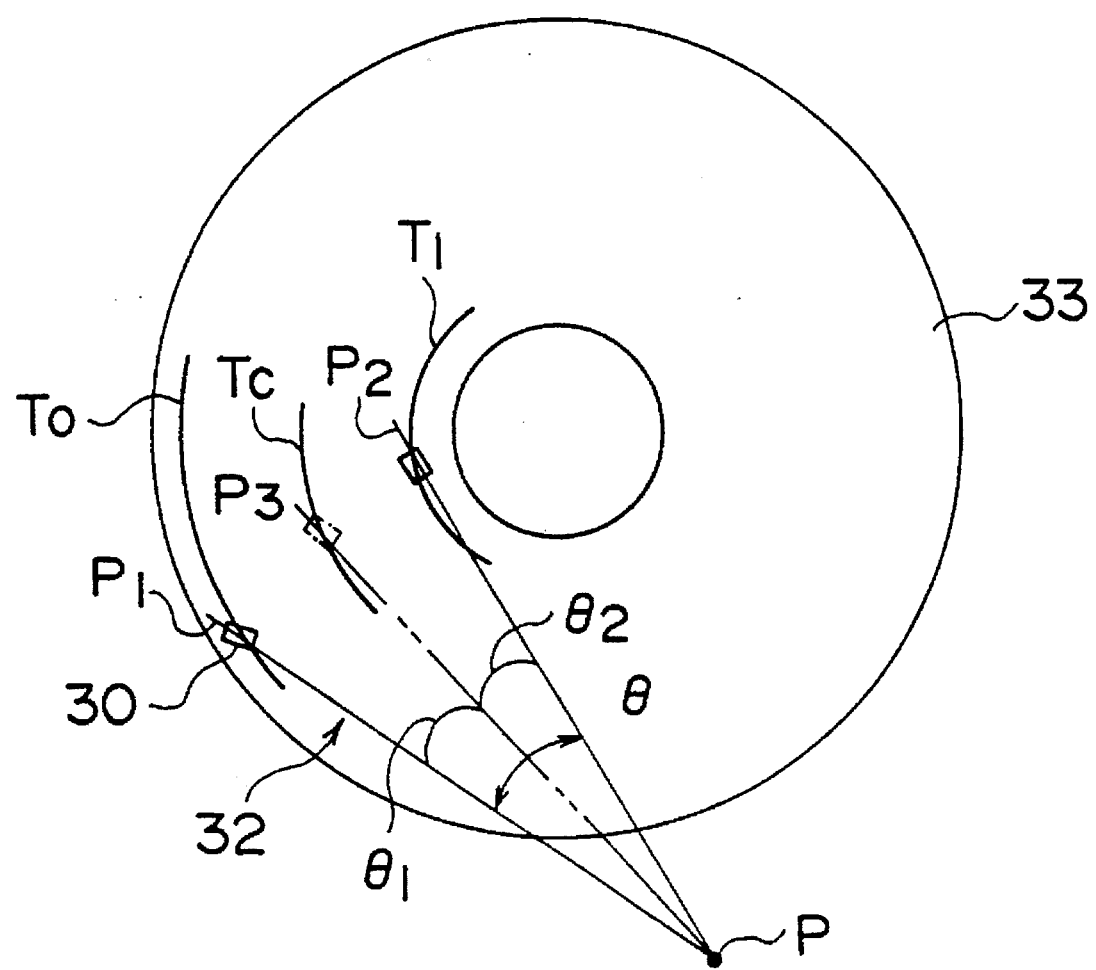
FIG. 3 is a diagram illustrating a swing-type actuator on which a thin-film magnetic head is mounted and a magnetic disk.

A thin-film magnetic head 30 shown in FIGS. 2A and 2B is mounted, as shown in FIG. 3, at an end of a swing-type actuator 32 in a magnetic disk device. Referring to FIG. 3, the swing-type actuator 32 pivots on a supporting point P within an angle range of Θ, so that the thin-film magnetic head is moved in the radial direction of a magnetic disk 33 within a range between the outermost position P1 (corresponding to the outermost track To) and the innermost position P2 (corresponding to the innermost track Ti). The sum of the yaw angle Θ1 between the intermediate position P3 (corresponding to the center track Tc) and the outermost position P1 and the yaw angle Θ2 between the intermediate position P3 and the innermost position P2 is the swing angle Θ. In a case where the swing angle Θ is equal to about 20 degrees, the yaw angles e1 and Θ2 are equal to about 10 degrees.

A thin-film magnetic head 30 having a structure shown in FIGS. 2A and 2B is a sharing type magnetic head. Referring to FIGS. 2A and 2B, a reproducing head part 50 is formed on a substrate 40, and a recording head part 48 is further formed on the reproducing head part 50. The reproducing head part 50 has an insulating layer 41, a lower shield layer 42, an insulating layer 41a, a FeN layer 44 and an MR element 43. The lower shield layer 42 is made of NiFe. The MR element 43 is provided in the insulating layer 41a so as to face the surface 100 of the magnetic disk 33. The FeN layer 44 functions as an upper shield layer. A reproducing gap 51 having a gap-length "c" is formed between the lower shield layer 42 (NiFe) and the FeN layer 44 so as to face the surface 100 of the magnetic disk 33. The recording head part 48 has the FeN layer 44, an insulating layer 47a, an upper magnetic layer 46, an insulating layer 47 and coils 45. The FeN layer 44 is shared by the reproducing head part 50 and the recording head part 48, and used as a lower magnetic layer in the recording head part 48. The upper magnetic layer 46 is made of NiFe. The FeN layer 44 and the upper magnetic layer 46 function as the magnetic poles. The coils 45 are provided in the insulating layer 47a so that a magnetic circuit is formed by the coils 45, the FeN layer 44 and the upper magnetic layer 46. A recording gap having a gap-length "b" is formed between ends of the FeN layer 44 (the lower magnetic layer) and the upper magnetic layer 46. The upper magnetic layer is covered by the insulating layer 47.

Figure 4:
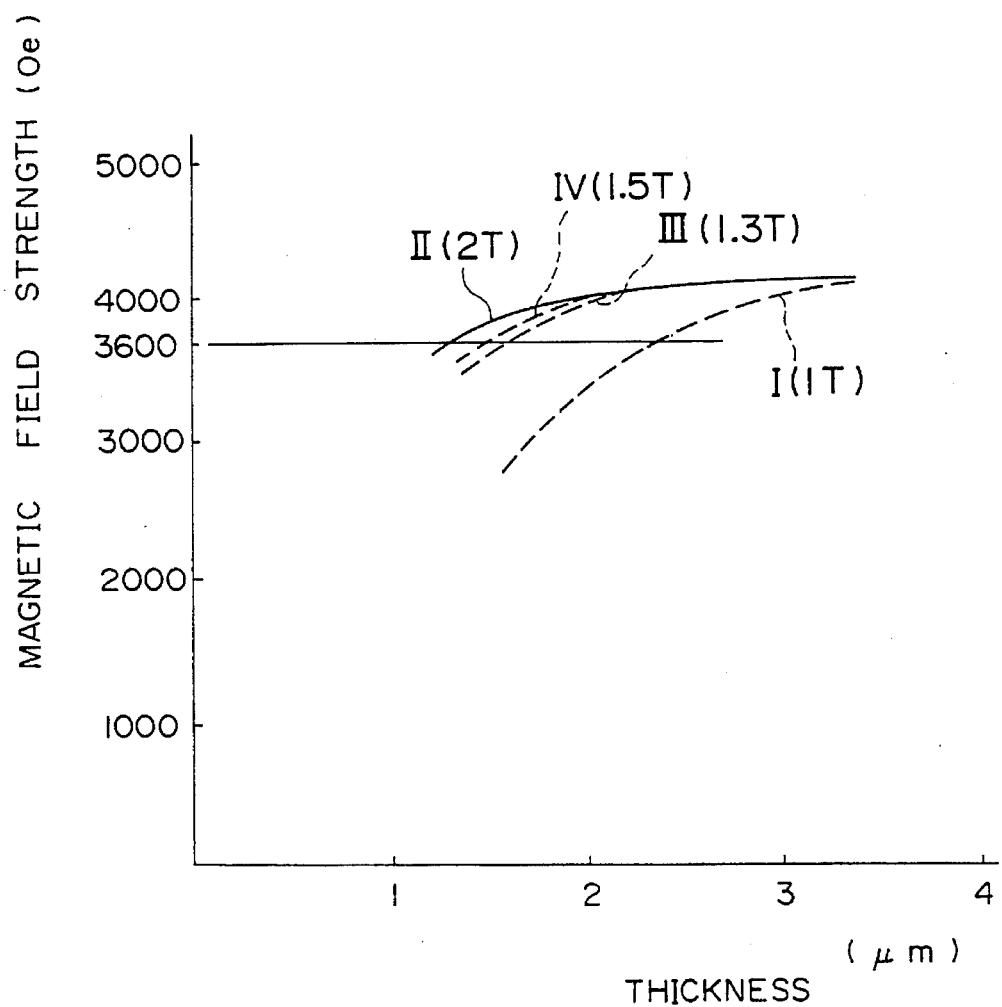
FIG. 4 is a graph illustrating relationships between the thickness of the magnetic layer and the magnetic field strength in parameters of saturation magnetic flux density.

The saturation magnetic flux density $B_s$ of FeN is about 2 T (tesla) which is about twice as large as that of NiFe forming the conventional magnetic poles. The characteristic line II in FIG. 4 shows the relation between the thickness (t) of the FeN layer 44 (the magnetic layer) having the saturation magnetic flux density of 2T and the magnetic field strength formed in a horizontal direction in an area adjacent to the recording gap 49. According to this characteristic line II, even if the thickness (t) of the FeN layer 44 is reduced to 1.3 μm, the magnetic field strength of 3,600 Oe (oersted) is obtained.

Thus, in the structure of the thin-film magnetic head 30 shown in FIGS. 2A and 2B, the thickness (t1) of the FeN layer 44 used as the shield layer and the magnetic pole is set to 1.3 μm. In this case, the gap-length "b" of the recording gap 49 is about 0.4 μm, and the gap-length "c" of the reproducing gap 51 is about 0.4 μm. The gap interval a1 between the recording gap 49 and the reproducing gap 51 is about 1.7 μ which is about half that of the conventional thin-film magnetic head (shown in FIGS. 1A and 1B).

Figure 5:
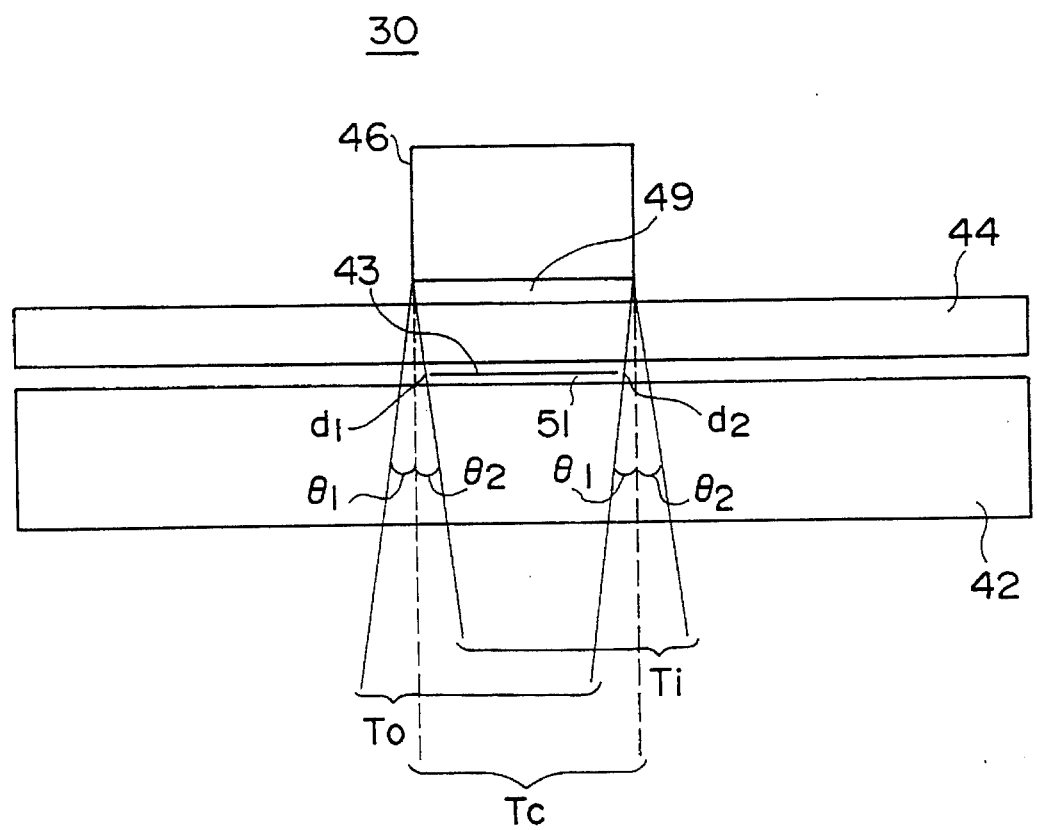
FIG. 5 is a diagram illustrating a yaw angle loss of a thin-film magnetic head mounted on the swing-type actuator.

A description will now be given, with reference to FIG. 5, of the yaw angle loss of the thin-film magnetic head 30, having the above structure, mounted on the swing-type actuator.

A state where the thin-film magnetic head 30 is positioned at the intermediate position P3 corresponding to the center track Tc is defined as the base state. In the base state, it is assumed that the center track Tc is not inclined against the recording gap 49, as shown in FIG. 5. When the recording gap 49 of the thin-film magnetic head 30 is fully aligned with the center track Tc in the base state, the reproducing gap 51 is fully aligned with the center track Tc and is not inclined against the center track Tc.

The swing-type actuator 32 pivots by Θ1 so that the thin-film magnetic head 30 is positioned at the outermost position P1 corresponding to the outermost track To. When the recording gap 49 completely faces the outermost track To in this state, the outermost track To is inclined by Θ1 against the reproducing gap 51, as shown in FIG. 5. In this state, the reproducing gap 51 is shifted by a length d1 relative to the outermost track To toward the center of the magnetic disk 33.

The swing-type actuator 32 pivots by Θ2 so that the thin-film magnetic head is positioned at the innermost position P2 corresponding to the innermost track Ti. When the recording gap 49 is fully aligned with the innermost track Ti in this state, the innermost track Ti is inclined by 82 against the reproducing gap 51, as shown in FIG. 5. In this state, the reproducing gap 51 is shifted toward the perimeter of the magnetic disk 33 by a length d2 relative to the innermost track Ti in an outer direction of the magnetic disk 33.

If the width of the MR element 43 is almost equal to the width of each track, due to the above shift of the reproducing gap 51 relative to the tracks, the MR element 43 in the reproducing gap 51 overlaps with an adjacent track. In this case, cross talk may occur.

Thus, to prevent the cross talk, the width of the MR element 43 must be smaller than the width of each track by the length (d1+d2). The length (d1+d2) corresponds to the yaw angle loss. If the yaw angle loss increases, the quality of reproduced signals deteriorates and it is difficult to arrange tracks at a high density on the magnetic disk. The length (d1+d2) depends on the gap interval between the recording gap 49 and the reproducing gap 51. That is, in the sharing type magnetic head, the thickness of the layer (the FeN layer 44) shared as the shield layer of the reproducing head part and the magnetic pole of the recording head part determines the yaw angle loss.

In the above first embodiment, the gap interval a1 is equal to 1.7 μm (the thickness (t) of the FeN layer 44 is equal to 1.3 μm), so that the yaw angle loss is equal to 0.6 μm which is about a third of that of the conventional thin-film magnetic head. Thus, according to the first embodiment, since the yaw angle loss is reduced, signals having a high quality can be reproduced. In addition, the track on the magnetic disk 33 can be narrower than that of the conventional device, so that the information can be recorded at a high density in the magnetic disk.

A description will now be given of other embodiments of the present invention, with reference to FIGS. 6A, 6B, 7A, 7B, 8A, 8B, 9A and 9B. In FIGS. 6A, 6B, 7A, 7B, 8A, 8B, 9A and 9B, those parts which are the same as those shown in FIGS. 2A and 2B are given the same references.

Figure 6A:
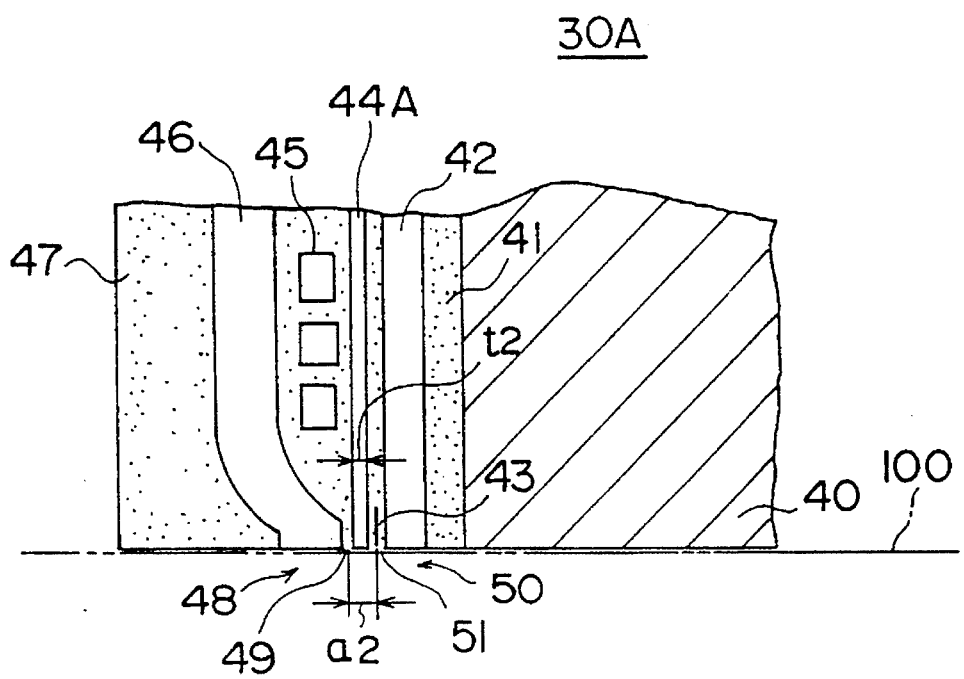
FIGS. 6A and 6B are diagrams illustrating a structure of a thin-film magnetic head according to a second embodiment of the present invention.
Figure 6B:
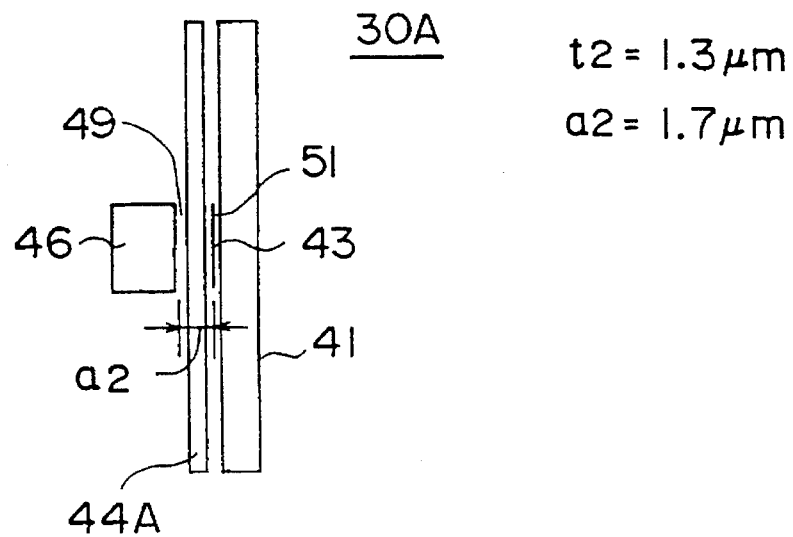

FIGS. 6A and 6B show a structure of the thin-film magnetic head 30A according to a second embodiment of the present invention. In the second embodiment, an FeSi layer 44A is substituted for the FeN layer 44 shown in FIGS. 2A and 2B.

The saturation magnetic flux density $B_s$ of FeSi is 2 T (tesla). Thus, with reference to FIG. 4, the thickness t2 of the FeSi layer 44A is 1.3 μm, and the gap interval a2 between the recording gap 49 and the reproducing gap 51 is 1.7 μm.

Figure 7A:
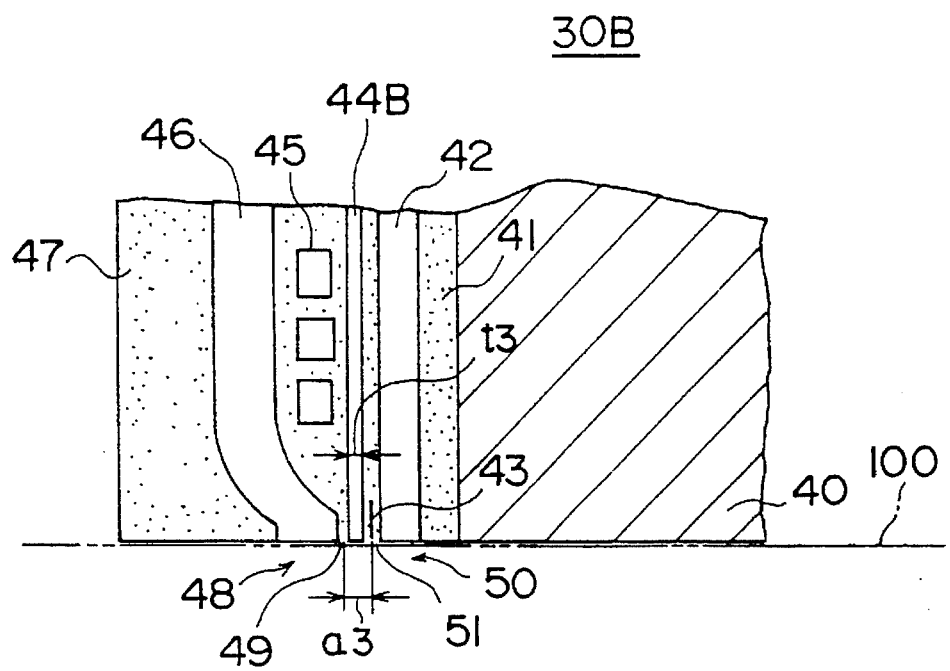
FIGS. 7A and 7B are diagrams illustrating a structure of a thin-film magnetic head according to a third embodiment of the present invention.
Figure 7B:
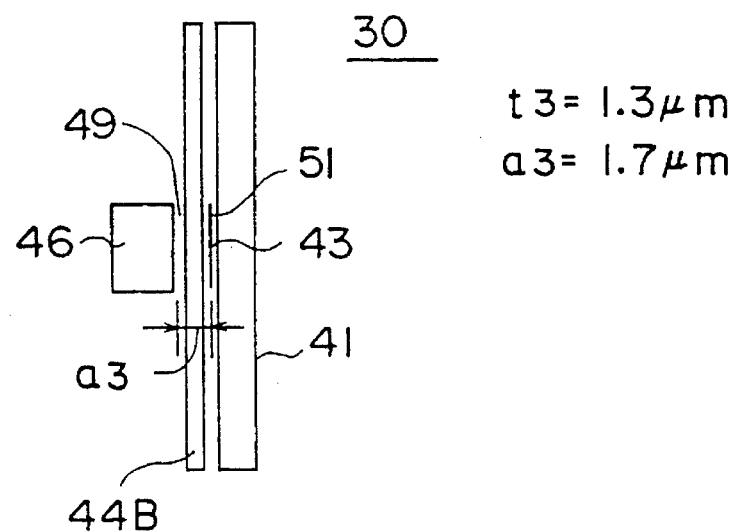

FIGS. 7A and 7B show a structure of the thin-film magnetic head 30B according to a third embodiment of the present invention. In the third embodiment, an NiFeCo layer 44B is substituted for the FeN layer 44 shown in FIGS. 2A and 2B.

The saturation magnetic flux density $B_s$ of NiFeCo is 2 T (tesla). Thus, with reference to FIG. 4, the thickness t3 of the NiFeCo layer 44B is 1.3 μm, and the gap interval a3 between the recording gap 49 and the reproducing gap 51 is 1.7 μm.

Figure 8A:
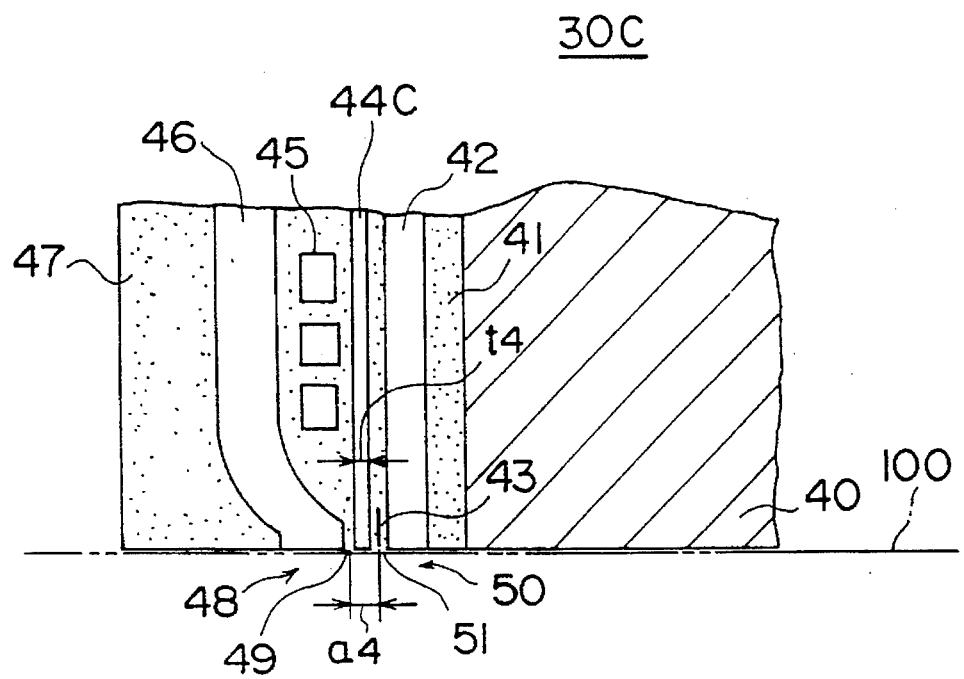
FIGS. 8A and 8B are diagrams illustrating a structure of a thin-film magnetic head according to a fourth embodiment of the present invention.
Figure 8B:
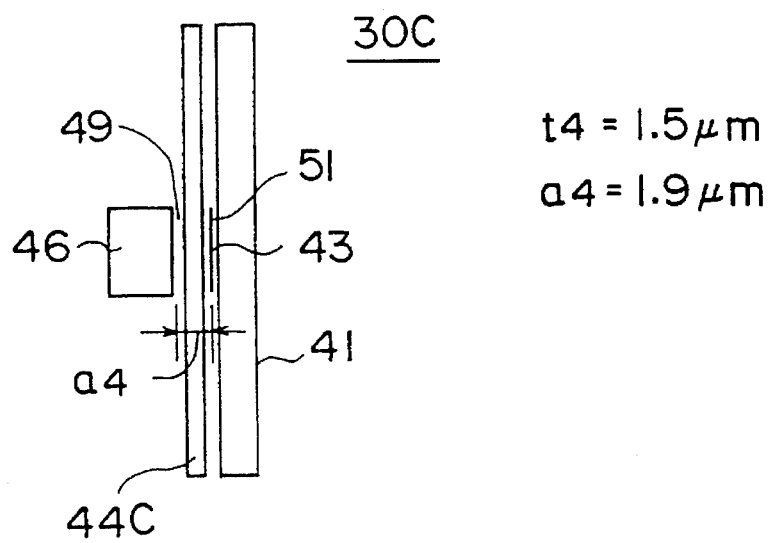

FIGS. 8A and 8B show a structure of the thin-film magnetic head 30C according to a fourth embodiment of the present invention. In the fourth embodiment, a CoZr layer 44C is substituted for the FeN layer 44 shown in FIGS.2A and 2B.

The saturation magnetic flux density $B_s$ of CoZr is 1.5 T (tesla). Thus, with reference to FIG. 4, the thickness t4 of the CoZr layer 44C is 1.5 μm, and the gap interval a4 between the recording gap 49 and the reproducing gap 51 is 1.9 μm.

Figure 9A:
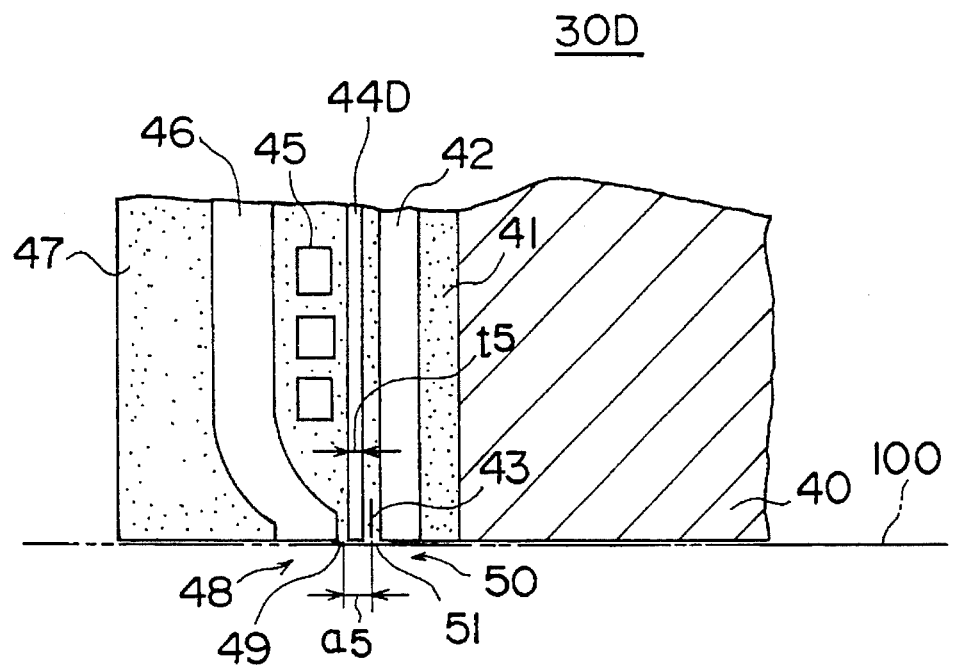
FIGS. 9A and 9B are diagrams illustrating a structure of a thin-film magnetic head according to a fifth embodiment of the present invention.
Figure 9B:
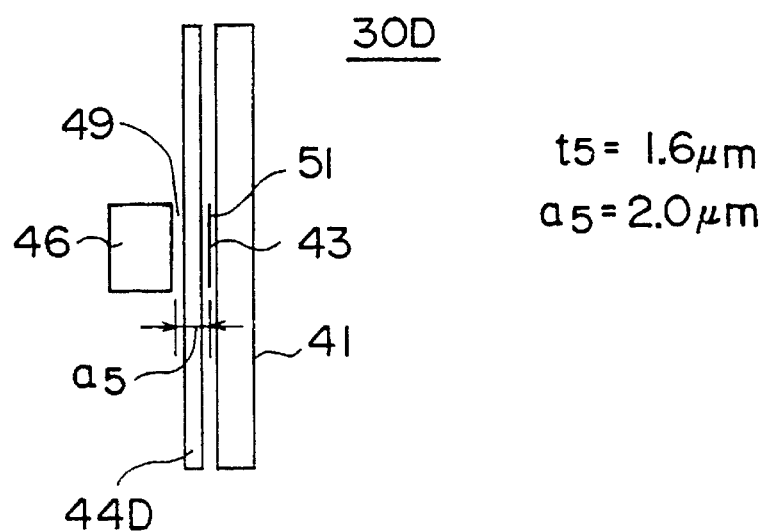

FIGS. 9A and 9B show a structure of the thin-film magnetic head 30D according to a fifth embodiment of the present invention. In the fifth embodiment, a CoZrX (X is a single element selected from among at least Cr, Nb, Rh and Te) layer 44D is substituted for the FeN layer 44 shown in FIGS. 2A and 2B.

The saturation magnetic flux density $B_s$ of CoZrX is 1.3 T (tesla). Thus, with reference to FIG. 4, the thickness t5 of the CoZrX layer 44D is 1.6 μm, and the gap interval a5 between the recording gap 49 and the reproducing gap 51 is 2.0 μm.

The thin-film magnetic head in each of the above embodiments is the sharing type magnetic head having a layer shared as the shield layer of the reproducing head part and the magnetic pole of the recording head part. However, the present invention is applicable to the separate type magnetic head in which the shield layer of the reproducing head part and the magnetic pole of the recording head part are separated from each other.

The present invention is not limited to the aforementioned embodiments, and variations and modifications may be made without departing from the scope of the claimed invention.

What is claimed is:

1. A thin-film magnetic head comprising:

a recording unit having a first magnetic pole and a second magnetic pole for generating a magnetic flux at a recording gap formed between ends of said first magnetic pole and said second magnetic pole, the magnetic flux being used to magnetically record information on a magnetic disc; and a reproducing unit, having a first shield layer, a second shield layer and reproducing element located between said first shield layer and said second shield layer, for reproducing information from said magnetic disk at a reproducing gap formed between ends of said first shield layer and said second shield layer, said recording gap and said reproducing gap being separated from each other, wherein said recording unit and said reproducing unit are integrated with each other in a state 71 where an interval between a center of the recording gap and a center of the reproducing gap is equal to or less than 2 um.

2. The thin-film magnetic head as claimed in claim 1, wherein said reproducing element is a magnetoresistance effect element, and wherein said thin-film magnetic head has a soft magnetic layer shared, as said second magnetic pole and said second shield layer, by said recording unit and said reproducing unit, said soft magnetic layer having a thickness less than 2 um.

3. The thin-film magnetic head as claimed in claim 2, wherein said soft magnetic layer has a saturation magnetic flux density equal to or greater than 1.3 tesla.

4. The thin-film magnetic head as claimed in claim 3, wherein said soft magnetic layer is made of FeN.

5. The thin-film magnetic head as claimed in claim 3, wherein said soft magnetic layer is made of FeSi.

6. The thin-film magnetic head as claimed in claim 3, wherein said soft magnetic layer is made of NiFeCo.

7. The thin-film magnetic head as claimed in claim 3, wherein said soft magnetic layer is made of CoZr.

8. The thin-film magnetic head as claimed in claim 3, wherein said soft magnetic layer is made of CoZrX, X being an element selected from a set of elements (Or, Nb, Rh and Ta).

* * * * *